United States Patent [19]
George

[11] 3,772,139
[45] *Nov. 13, 1973

[54] GALVANICALLY-DESTRUCTING METAL STRUCTURES

[75] Inventor: Percy F. George, Midland, Mich.

[73] Assignee: The Dow Chemical Company, Midland, Mich.

[ * ] Notice: The portion of the term of this patent subsequent to Dec. 21, 1988, has been disclaimed.

[22] Filed: May 20, 1971

[21] Appl. No.: 145,300

Related U.S. Application Data

[62] Division of Ser. No. 4,614, Jan. 21, 1970, Pat. No. 3,629,092.

[52] U.S. Cl. ................. 161/225, 136/153, 136/166, 156/313, 204/194
[51] Int. Cl. ...................... B32b 15/04, B32b 15/20
[58] Field of Search ................... 204/194, 196, 197; 161/225; 156/313; 136/153, 107, 155, 157, 166

[56] References Cited
UNITED STATES PATENTS

| | | | |
|---|---|---|---|
| 3,629,091 | 12/1971 | George | 204/197 |
| 3,556,859 | 1/1971 | Ohki | 136/107 |
| 2,793,244 | 5/1957 | Grinten | 136/153 X |
| 2,601,214 | 6/1952 | Robinson | 204/197 |
| 2,806,079 | 9/1957 | Reid et al. | 204/197 X |
| 2,846,385 | 8/1958 | Buchan | 204/197 X |

*Primary Examiner*—Harold Ansher

[57] ABSTRACT

A metal laminate is provided which will deteriorate at least in part after the interior of the laminate is contacted by moisture. Self-destructing containers are fabricated of this structural laminate. The laminate includes at least two layers of dissimilar metals, the layers being electronically connected and one layer being anodic to the other layer. Positioned between the metal layers is at least one layer of an electrolyte-forming composition capable of establishing ionic communication between the metal layers when the composition is contacted with moisture. A preferred electrolyte-forming composition is an inorganic salt, such as ammonium chloride or sodium chloride. When the electrolyte-forming composition is contacted by sufficient moisture to provide ionic conduction between the metal layers, a galvanic cell is formed in which the anodic metal layer deteriorates by galvanic corrosion.

6 Claims, 2 Drawing Figures

Patented Nov. 13, 1973

3,772,139

INVENTOR.
Percy F. George
BY
J. Dean Clausen
AGENT

GALVANICALLY-DESTRUCTING METAL STRUCTURES

CROSS REFERENCE TO RELATED APPLICATION

This is a DIVISION of application Ser. No. 4,614, filed Jan. 21, 1970, now U.S. Pat. No. 3,629,092.

BACKGROUND OF THE INVENTION

The invention relates broadly to self-destructing metal structures comprising two or more electronically connected layers of dissimilar metals and one or more layers of an electrolyte-forming composition positioned between each pair of metal layers. The invention further concerns a metal container fabricated of such a structural laminate.

Most non-returnable metal containers in use today require a relatively long period of time to deteriorate when the container is discarded. With millions of such containers being discarded each day, the problem of sufficient space to dispose of the refuse is one of growing concern. It would be desirable, therefore, to provide a metal container which after being opened would deteriorate within a few months in an outdoor environment.

OBJECTS

Accordingly, a principal object of the invention is to provide a metal laminate suitable for the fabrication of containers, which after being opened will deteriorate substantially more rapidly than the prior art metal containers.

A more specific object is to provide a metal container fabricated from a laminate including dissimilar metal layers and an electrolyte-forming composition, to provide a container which will undergo deterioration, aided by galvanic corrosion, upon contacting the electrolyte-forming composition with moisture.

SUMMARY OF THE INVENTION

Broadly, the invention provides a structural metal laminate useful for the fabrication of metal containers, which laminate undergoes corrosive deterioration once its interior is contacted by moisture. In one further embodiment of the invention, a container is provided, with at least one wall member of the container comprising the delineated structural laminate. This laminate includes at least two layers of dissimilar metals, in which one of the layers is anodic to the other and wherein the layers are electronically connected, i.e. connected so as to permit electron flow from one to the other. The laminate also includes at least one layer of an electrolyte-forming composition which is positioned between the metal layers of the laminate, the composition being capable, when contacted with moisture, of providing ionic communication between the metal layers.

DESCRIPTION OF A PREFERRED EMBODIMENT

Figure 1:
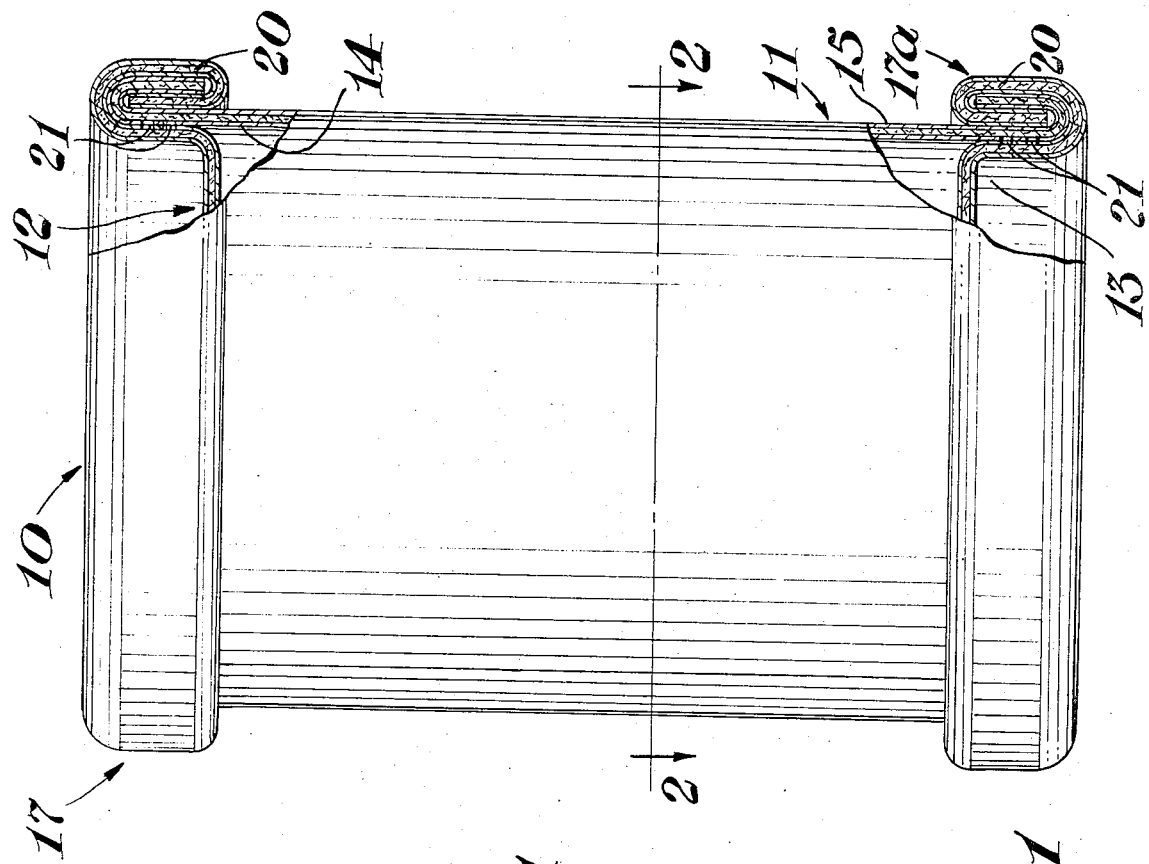
FIG. 1 is a front elevation view, partly in section, of a container made from the described laminate.
Figure 2:
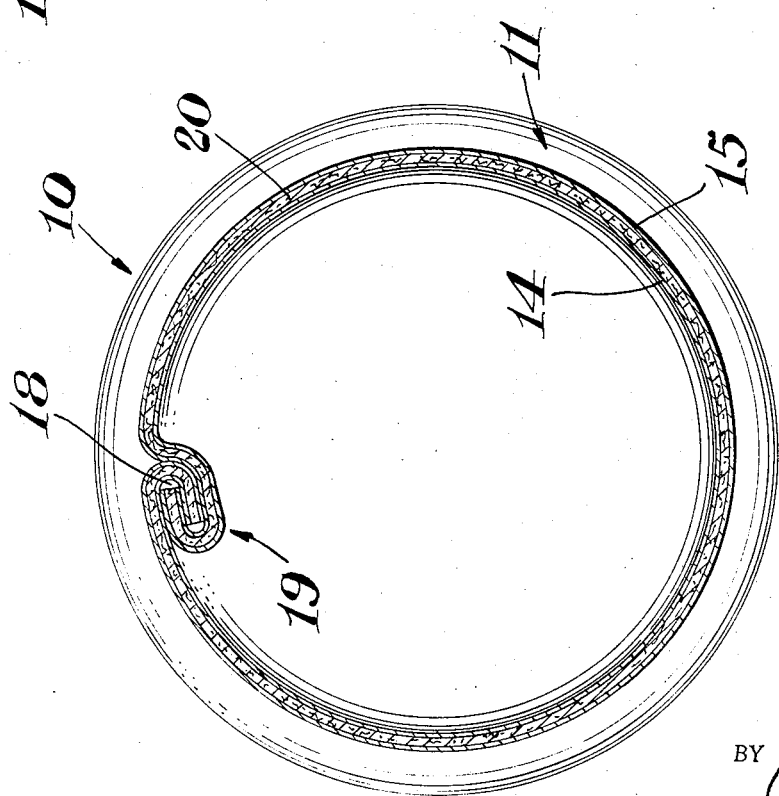
FIG. 2 is a view of the container of FIG. 1 taken on the line 2—2.

Referring to the drawings, the numeral 10 indicates generally a cylindrical metal container. Basically, container 10 comprises a side wall 11, a top wall 12 and a bottom wall 13. According to the embodiment of the invention illustrated herein the container walls comprise a three-layer structural laminate. The laminate includes at least two metal layers 14, 15, the layers being dissimilar metals or metal alloys, with one layer being anodic to the other layer. Electron flow between the metal layers 14, 15 is provided for by electronically connecting the layers within the top and bottom chime portions 17, 17a of container 10. A similar electronic connection between the metal layers of the laminate which comprise the side wall 11 is formed by joint 18 of side seam 19 (note FIG. 2). At least one layer of an electrolyte-forming composition 20 is positioned between the metal layers 14 and 15.

The metal layers 14, 15 of the laminate structure may be either single metals, metal alloys, clad metals, or the like, so long as one layer is anodic to the other layer. Selection of metals or metal alloys suitable for the laminate structure, i.e. to obtain one layer which is anodic and another layer which is cathodic, may be made from a standard reference table of the Electromotive Series of Metals and Alloys (see Lange's Handbook of Chemistry, 10th ed., edited by N.A. Lange, McGraw Hill Book Co., 1967, pp. 1223–1230). To obtain the desired corrosive reaction between the anodic and cathodic metal layers, the electrode potential difference between the metals should be at least about 0.10 volt and, preferably about 0.30 volt. Typical anode-cathode combinations which may be used in the laminate structure are combinations of various metal alloys such as aluminum-based metals with iron-based metals, magnesium-based metals with aluminum-based metals, magnesium-based metals with iron-based metals and zinc-based metals with iron-based metals. The alloy composition should contain at least about 50 percent and more preferably at least about 85 percent of the "base" metal, i.e. aluminum, magnesium, zinc, iron or the like.

The choice of which metals or alloys are employed for each layer in the container laminate will depend on various factors, such as strength requirements of the laminate, cost and feasibility of using certain metals in a container fabrication, and the like. Although thickness of the metal layers is not critical, each layer will usually be a metal foil less than about ⅛ inch thick. Another consideration is positioning of the metal layers within a fabricated container. For example, if it is desired to have the inner layer (14) function as an anode and the outer layer (15) function as a cathode, the inner layer could be an aluminum-based metal and the outer layer could be a metal cathodic to the aluminum-based layer, such as an iron-based alloy. If it is desired instead that the inner layer be cathodic and the outer layer be anodic, the positions of the aluminum-based and iron-based metal layers in the laminate are reversed. Preferably, the container laminate, which includes the metal layers 14, 15 and the electrolyte-forming composition 20, is a generally flexible structure having an over-all or total thickness of not more than about 0.250 in.

For the electrolyte-forming composition 20, the preferred materials are those inorganic dry salts capable of ionizing in a water solution to thereby provide ionic communication between the metal layers 14, 15, but which in a dry condition are essentially non-conductors. Broadly, the preferred electrolyte-forming compositions are the anhydrous metal and non-metal salts. Typical metal salts are the alkali metal and alkaline earth metal salts. Particularly preferred alkali metal salts are sodium, potassium, and lithium chlorides, bromides, iodides, acetates, bicarbonates, nitrates, phosphates and sulfates. Preferred alkaline earth metal salts are the magnesium and barium salts. Sodium chloride, potassium chloride, lithium chloride, sodium sulfate, barium chloride and magnesium chloride are especially preferred salts of the alkali metal and alkaline earth metal groups.

It is also contemplated that certain organic compounds, particularly compounds which ionize in a water solution may be used. Typical of organic compounds which may be used are tartaric acid and citric acid.

With regard to non-metal salts, the ammonium salts are preferred. Suitable ammonium salts are the chlorides, bromides, iodides, cyanides, bicarbonates, nitrates, phosphates and sulfates. Especially preferred non-metal salts are ammonium chloride, ammonium sulfate and ammonium bromide. Substituted ammonium salts, such as amine salts, may also be used. It is also contemplated to add one or more hygroscopic materials to the electrolyte-forming salt to enhance its water-absorbing capacity. Preferred electrolyte-forming compositions are mixtures of alkali metal salts with deliquescent salts, such as calcium chloride or magnesium chloride.

Positioning or layering of the electrolyte-forming salt between the metal layers of the laminate structure may take several forms. For example, the salt composition may be adhered to the inner surfaces of the metal layers, it may be placed between the metal layers as a loose composition or it may be impregnated onto a bibulous carrier material and the carrier strip sandwiched between the metal layers of the laminate. Use of a salt-impregnated carrier strip as the electrolyte-forming composition is preferred, since the bibulous carrier material can act as a wick to help carry moisture between the metal layers of the laminate after the container is opened. Suitable carrier materials for the electrolyte-forming composition include absorbent papers, such as paper toweling; porous hydrophilic adhesives, porous polymeric films, such as open-cell plastic films, and soluble polymeric films of water-soluble cellulosic film formers, such as methyl-cellulose, hydroxyethyl cellulose and carboxymethylcellulose. It will be readily understood that the electrolyte-forming composition is sealed between the metal layers of the laminate to insure that the composition does not come into premature contact with moisture.

When it is desired to initiate deterioration of the laminate, as in the walls of a discarded container, the laminate structure is severed, as with a tear strip (not shown) integrally formed in the top wall 12 of the container. Although a tear strip is preferred, any device which will effectively sever or puncture the container laminate, such as a can opener, may be used to achieve communication between the electrolyte-forming composition and environmental moisture. When the container laminate is severed and the electrolyte-forming salt is wetted with moisture, which may be provided as rain, snow, dew, condensate, atmospheric moisture, liquid from the contents of the container, or the like, an electrolyte solution is formed, providing ionic communication between the metal layers. Usually, formation of the electrolyte solution initiates galvanic corrosion of the anodic metal layer, which is followed by chemical corrosion of the cathodic metal layer in the resulting electrolyte solution. By selecting certain combinations of metals and salts for the laminate structure, however, a simultaneous deterioration of the anodic and cathodic metal layers can be achieved. Although the simultaneous deterioration of the dissimilar metal layers is not fully understood, it is believed to be, at least in part, a result of galvanic action.

In the illustrated container, once the laminate structure of the top wall 12 is severed, wetting of the salt layer 20 in side wall 11 of the container is enhanced by migration of the moisture through one or more perforations 21, which extend through the double metal layer joint formed in chime portions 17 and 17a. In fabricating the chime portion 17 it will be apparent that the perforations 21 must be placed far enough up in the double layer joint to be sealed off from the contents of the container. Construction of the chime portion in this manner will prevent any moisture in the container contents from contacting the electrolyte-forming salt before the container is opened and thereby avoid premature initiation of the corrosive reaction.

Further embodiments of the invention include laminates and containers fabricated thereof, comprising multi-layer structural laminates with more than two metal layers and one or more electrolyte-forming compositions positioned between each pair of metal layers. A specific example of this embodiment is a structural laminate comprising two layers of an aluminum-based metal and one layer of an iron-based metal, which is positioned between the aluminum layers. The laminate also includes an electrolyte-forming composition, defined by a bibulous carrier strip impregnated with sodium chloride, which is positioned between each of the pairs of metal layers.

The following example is given to illustrate the invention, but it is not to be construed as limiting the invention to the embodiment described herein.

EXAMPLE 1

A sheet of paper towel measuring approximately 1 in. wide and 3 in. long was soaked in a saturated aqueous solution of ammonium chloride and the salt-impregnated paper sheet was dried at room temperature. A sheet of steel measuring about 1 in. wide, 3 in. long and 0.007 in. thick was adhered to one side of the paper sheet by applying spots of adhesive at various places between the metal and the paper. A sheet of aluminum foil about 1 in. wide, 3 in. long and 0.002 in. thick was adhered to the opposite side of the paper sheet, to complete the three-layer laminate. The aluminum and steel sheets were crimped together at the top edge of the section to establish electronic contact, i.e. metal-to-metal contact, between the dissimilar metal layers.

The metal section was stood upright in a pool of shallow water and held in this position for about 48 hours to wet the exposed paper layer along the bottom edge of the laminate. At the end of the 48-hour period the laminate section was removed from the water and allowed to lay on a bench for several days. After about five days the aluminum sheet had been almost completely consumed by corrosion, but no appreciable change could be observed in the steel sheet. After another five days, it was observed that the steel sheet had deteriorated appreciably from corrosion. From this point on, noticeable corrosion of the steel was observed daily, until the entire sheet had been nearly consumed several weeks later.

In a manner similar to the procedure of Example 1, other metal laminates capable of galvanically-accelerated corrosion upon exposure to moisture may be prepared. Representative of such laminate structures are combinations of various metal alloys, such as magnesium-based metals with aluminum-based metals, magnesium-based metals with iron-based metals and zinc-based metals with iron-based metals. Essentially similar results as that achieved in Example 1, with respect to corrosion of the laminate structure, was achieved by using in place of ammonium chloride, one of the following electrolyte-forming salts or mixtures of such salts: sodium chloride, ammonium sulfate, tartaric acid or calcium chloride.

What is claimed is:

1. A self-destructing metal structural laminate which consists of:
   at least a first and second metal layer wherein the metal layers are electronically connected and one of the metal layers is anodic to the other metal layer;
   at least one layer of an electrolyte-forming composition which is positioned between the metal layers, which is a dry, non-conducting, water-soluble, ionizable salt, and which salt is capable, when contacted with moisture, of ionizing to provide ionic communication between the metal layers, and wherein
   the said metal structural laminate has an overall thickness of not more than about 0.250 inch.

2. The structural laminate of claim 1 in which the electrolyte-forming composition is sealed from the atmosphere.

3. The structural laminate of claim 1 in which the electrode potential difference between the metal layers is at least about 0.10 volt.

4. The structural laminate of claim 1 in which the electrolyte-forming composition is impregnated into a strip of bibulous material.

5. The structural laminate of claim 1 in which one of the metal layers is an aluminum-based metal and the other metal layer is an iron-based metal.

6. The structural laminate of claim 5 in which the electrolyte-forming composition is ammonium chloride.

* * * * *